(12) United States Patent  (10) Patent No.: US 9,349,415 B1
Mader et al.  (45) Date of Patent: May 24, 2016

(54) QUALIFYING A RECORDING HEAD BASED ON SYMMETRY OF A CROSS-TRACK PROFILE

(71) Applicant: Seagate Technology LLC, Cupertino, CA (US)

(72) Inventors: Drew Michael Mader, Bloomington, MN (US); Alfredo Sam Chu, Prior Lake, MN (US); Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/716,171

(22) Filed: May 19, 2015

(51) Int. Cl.
 *G11B 27/36* (2006.01)
(52) U.S. Cl.
 CPC ..................................... *G11B 27/36* (2013.01)

(58) Field of Classification Search
 CPC ............. G11B 5/5534; G11B 5/59611; G11B 20/10203; G11B 2005/0013; G11B 27/36; G11B 5/012; G11B 2220/20; G11B 2220/90
 USPC .......................... 360/25, 31, 75, 65, 46, 27, 53
 See application file for complete search history.

(56) References Cited

U.S. PATENT DOCUMENTS

| 6,249,392 | B1 * | 6/2001 | Sacks .................... G11B 5/5534 324/210 |
| 7,119,537 | B2 | 10/2006 | Che et al. |
| 7,633,694 | B2 * | 12/2009 | Alex ....................... G11B 5/455 360/25 |
| 8,138,754 | B2 | 3/2012 | Ogawa et al. |
| 8,179,624 | B2 | 5/2012 | Inomata |
| 8,614,934 | B1 | 12/2013 | Tomikawa et al. |
| 8,625,224 | B1 | 1/2014 | Lin et al. |
| 8,854,929 | B1 | 10/2014 | Champion et al. |

\* cited by examiner

*Primary Examiner* — Nabil Hindi
(74) *Attorney, Agent, or Firm* — Hollingsworth Davis, LLC (57) ABSTRACT

A signal is recorded over at least part of a track a heat-assisted recording medium via a heat-assisted magnetic recording head. Symmetry of a cross-track profile of the recorded signal is determined, and the recording head is qualified based on the symmetry of the cross-track profile.

20 Claims, 6 Drawing Sheets

QUALIFYING A RECORDING HEAD BASED ON SYMMETRY OF A CROSS-TRACK PROFILE

SUMMARY

The present disclosure is directed to qualifying a recording head based on symmetry of a cross-track profile. In one embodiment, a signal is recorded over at least part of a track on a heat-assisted recording medium via a heat-assisted magnetic recording head. Symmetry of a cross-track profile of the recorded signal is determined, and the recording head is qualified based on the symmetry of the cross-track profile.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disk, nano-patch, nano-rod, etc.

Generally, the NFT is formed by depositing thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to determine the quality of a particular NFT (and other optical elements) before it is incorporated into hard disk drive assembly. Such methods may also be used in a hard disk assembly operating in the field, e.g., for diagnostic purposes.

Figure 1:
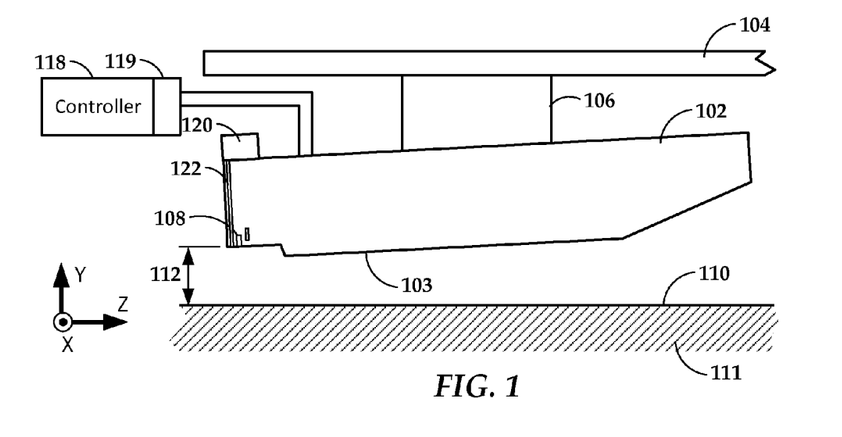
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
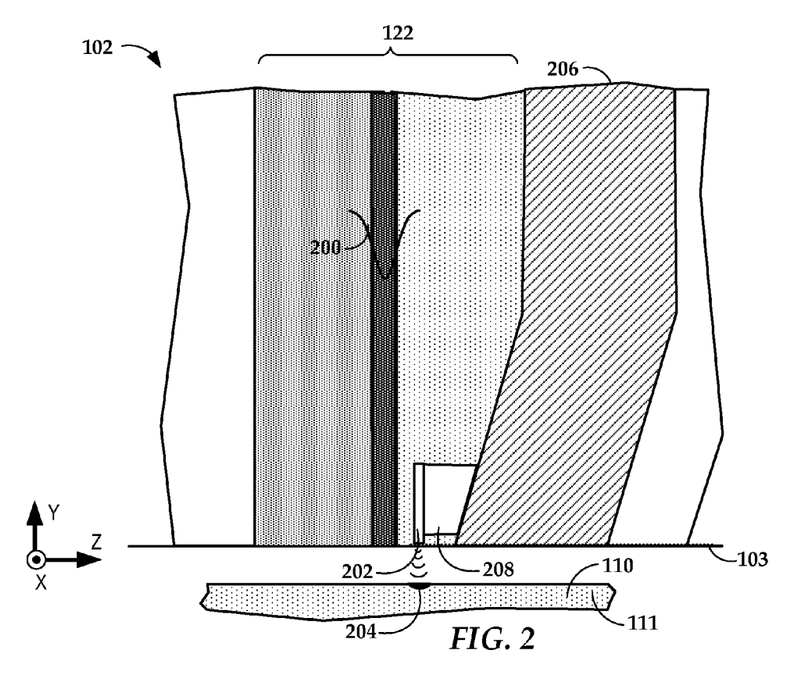
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, methods and apparatuses described herein facilitate determining the quality of an NFT and/or related optical components during drive manufacture. Rejecting sub-optimal read/write heads can help increase the service life of the hard disk drives in which the read/write heads are used.

Generally, a method involves examining read/write heads at a sub-assembly level to get a quantitative insight into the quality of the NFT and related optical components. This method could be employed early in the disk drive manufacturing process to characterize the NFT and determine its initial quality. In reference now to FIG. 3, a block diagram is a simplified illustration of procedures involved in factory assembly of parts of a HAMR disk drive according to an example embodiment. Generally, the procedures in FIG. 3 relate to manufacture of the read/write head subassemblies, as well as use of the read/write head in higher-level subassemblies.

Figure 3:
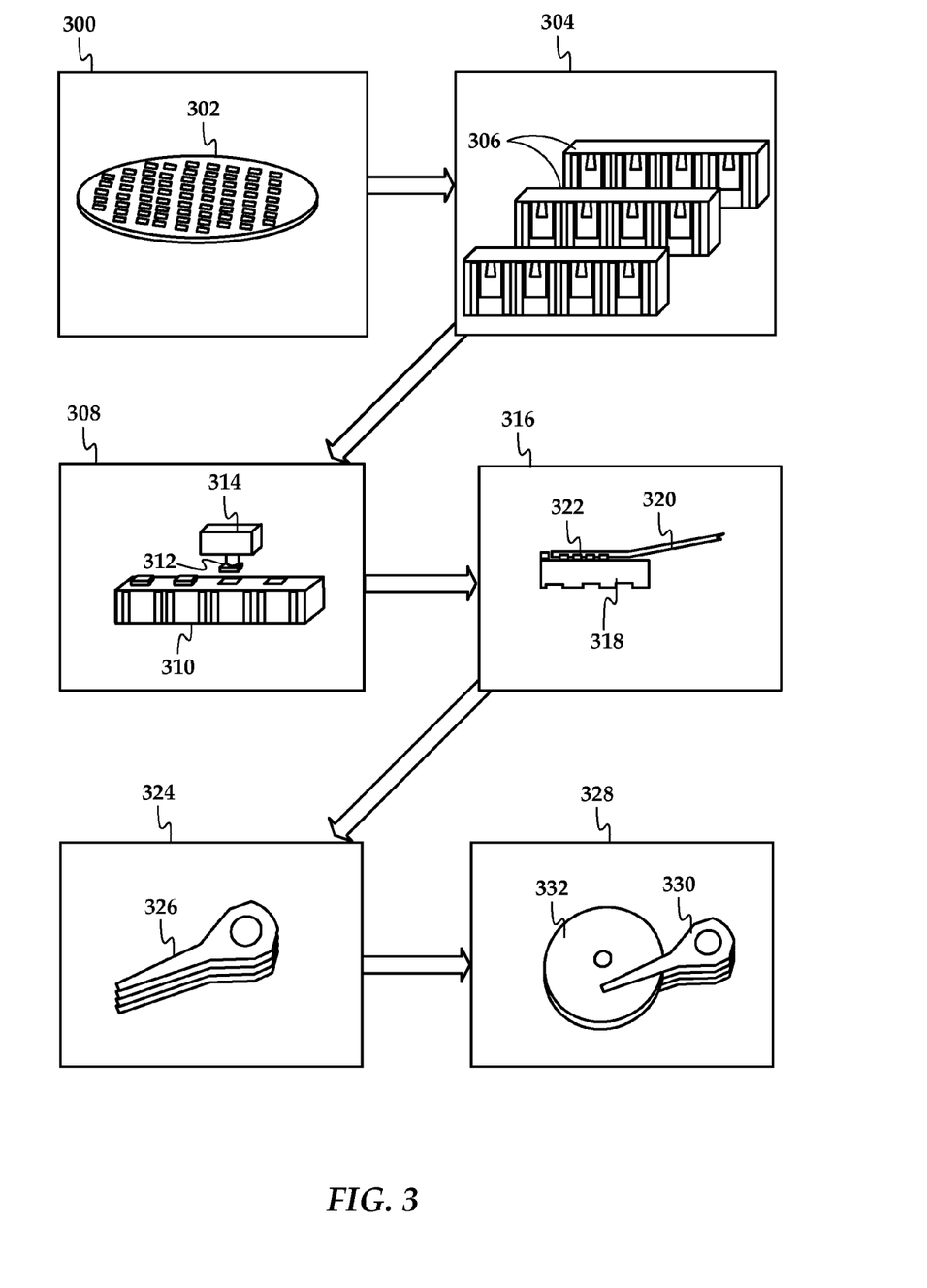
FIG. 3 is a block diagram of a recording medium and read/write components according to an example embodiment.

Block 300 represents manufacturing of the slider bodies onto a wafer 302 via photolithographic techniques, e.g., layer deposition, photomasking, etching, etc. Block 304 represents the division of the wafer 302 into bars 306 that contain multiple slider bodies. As seen in block 308, lasers 312 are attached to a bar 310 via a pick-and-place machine 314. The lasers 312 may also be attached after the bar 310 is separated into individual sliders. After laser attachment 308, physical and electrical bonding between the lasers and sliders/bars may be achieved via a reflow that melts bonding material (e.g., solder). At block 316, an individual slider assembly 318 (which includes slider body and laser) is attached to an arm 320 via a gimbal 322. At this stage, various electrical connections can be made between the slider assembly 318 and a flex circuit of the arm 320.

At block 324, multiple arms are assembled into a multi-arm assembly 326. Generally there may be one arm for each disk surface. In this example, there are two disks in the drive assembly, and so the arm assembly 326 includes four arms, each having a HAMR slider assembly at the end. The arm assembly 326 may include at least part of voice coil motor (VCM, not shown) that drives the arms, or the arms may be assembled to a VCM at a later step. At block 328, an arm assembly 330 is configured to interface with magnetic disks 332. The magnetic disks 332 may be test media that are part of a test fixture, or may be the disks used in the final assembly. It will be understood that there may be many steps not shown in FIG. 3, the figure being illustrative and not exhaustive. Generally, FIG. 3 indicates at block 328 a stage where the read/write heads are able to interface with (e.g., read from and write to) a recording medium, and at this stage can be tested as described below.

As noted above, the NFT of a HAMR can dictate a number of system performance parameters, such as track width, power consumption, and the reliability of the drive. While some aspects of the NFT performance can be determined before assembly, such as on wafer 302, bars 304, etc., other aspects of NFT performance may be best determined after the read/write head is able to read from and write to a recording medium, such as at block 328. According, methods, systems, and apparatuses described herein facilitate screening HAMR read write heads at a stage where an arm or arm assembly can interface with a recording medium. This screening could occur in the initial assembly of the head gimbal assembly, in a factory process after multi-disk writer testing, as part of active fly height calibration, and/or a laser calibration procedure, or any other procedure where the read/write head can apply heat to write data to a recording medium and read the data back. The screening can include a metric to sort out bad or sub-optimum NFTs. This screening save assembly costs, save test time, improve drive yield, boost long term reliability, etc.

Figure 4:
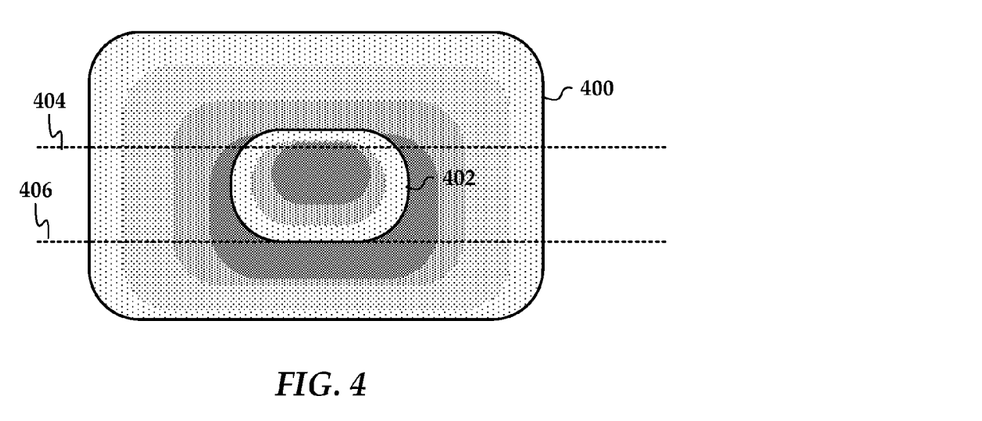
FIG. 4 is a block diagram illustrating how a near-field transducer affects writing of data to a recording medium according to an example embodiment.

In FIG. 4, a block diagram illustrates how a sub-optimum NFT may affect writing to a recording medium. Block 400 is represents a magnetic field applied to a recording medium at an instant of time via a HAMR read/write head. Block 402 represents a hotspot applied by an NFT of the read/write head during the same instant of time when writing to the recording medium. Lines 404 and 406 are intended to represent boundaries of a track to which the read/write is attempting to write data via the magnetic field 400 and hotspot 402. It should be noted that the objects of this diagram are not necessarily to scale, but intended to indicate that the hotspot 402 is significantly smaller than the coverage of the magnetic field 400.

The different shading within the magnetic field 400 is intended to represent variations of the magnetic field. Similarly, different shading within the hotspot 402 is intended to represent different temperatures to which the recording medium is heated. The extents of the hotspot 402 are much smaller than that of the magnetic field 400 and define the areal density of the written data. The characteristics of the hotspot 402 will dominate various parameters of the recorded data, such as track width, sharpness of field transitions, field strength along track centerline, adjacent track interference, etc. While the magnetic field 400 may also have variations, the field 400 outside of the hotspot 402 will have little or no effect on the recording medium because the regions outside of the hotspot 400 are below the Curie temperature, and therefore have higher magnetic coercivity than the hotspot 400.

In the illustrated example, the hotspot 402 has a non-symmetric heat profile in the cross-track direction (vertical direction in the view of FIG. 4). This asymmetry can be indicative of defects in the NFT and/or associated optical components. The asymmetry may indicate that data written using this read/write head will be more prone to errors when read back. The asymmetry may also be indicative of the NFT having shorter operational lifespan. Therefore, in order to determine the quality of the NFT, methods and apparatuses described herein involve writing and reading back test data to a track. Symmetry of the read signal amplitude as a function of the track offset is analyzed, and used to qualify the read/write head. An example of the method is shown in the flowchart of FIG. 5.

Figure 5:
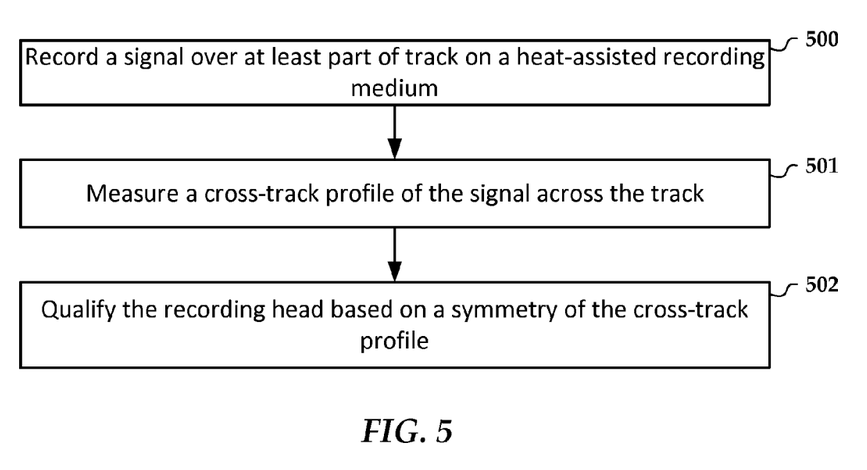
FIG. 5 is a flowchart illustrating a method according to an example embodiment.

The method shown in FIG. 5 involves writing 500 a signal over at least part of a track on a heat-assisted recording medium via a heat-assisted magnetic recording head. A cross-track profile of the recorded signal is measured 501. The profile may include strength of magnetic field transitions that are detected when reading the data, amplifier gain used in processing the signal, a signal-to-noise ratio of the signal, bit error rate of the signal, etc. The recording head is qualified 502 based on a symmetry of the cross-track profile. This qualification 502 may involve determining one or more symmetry metrics of the cross-track profile, the read/write head being passed or failed depending on whether the metrics satisfy one or more respective thresholds. In other cases, the qualification may result in a first group of heads being given a higher quality rating than another group of heads, both heads being usable in different classes of products and/or different applications.

In one embodiment, an output of a variable gain amplifier (VGA) in the read channel is used to determine symmetry of the recorded signal. Generally, a read head obtains an analog signal from a sensor (e.g., magnetoresistive sensor) that is held over a moving recording medium. The peak amplitude of the signal may vary based on a number of factors (e.g., tracking, media variations, degradation of the field, etc.) and so the VGA is used to amplify the signal to a desired level before it is processed by a read channel, which may include, among other things, an analog-to-digital converter (ADC) and a decoder.

The hotspot created by a HAMR write head will transition from the ambient temperature of the recording medium beyond its edges to a maximum value, which may be generally located at or near the center of the hotspot. The hotspot will be generally aligned with the center of the recorded track. The magnetic transitions of the recorded data will generally be stronger along the region of maximum recording temperature near the center of the hotspot, as will the electrical signals detected by the read sensor. The electrical signals will gradually decrease in amplitude away from the center of the hotspot and track. A cross-track profile of the signals can be detected and characterized by reading a track at small crosstrack offsets and looking at the gain of the VGA when decoding the track. The crosstrack offsets are obtained by commanding a servo system that positions the read/write head in the crosstrack direction to make small, cross-track offsets in the position of the read/write head. Generally, the VGA will have the lowest level of amplification along the center of the track (or any other cross-track location where the magnetic flux transitions are highest) and gradually increase as the read head is moved off-track-center.

Figure 6:
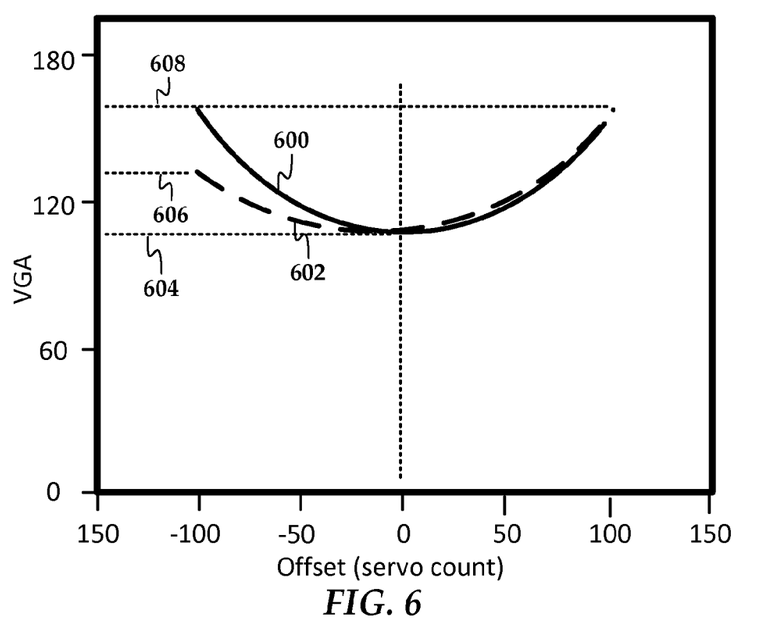
FIGS. 6 and 7 are graphs illustrating asymmetric cross-track profiles according to example embodiments.
Figure 7:
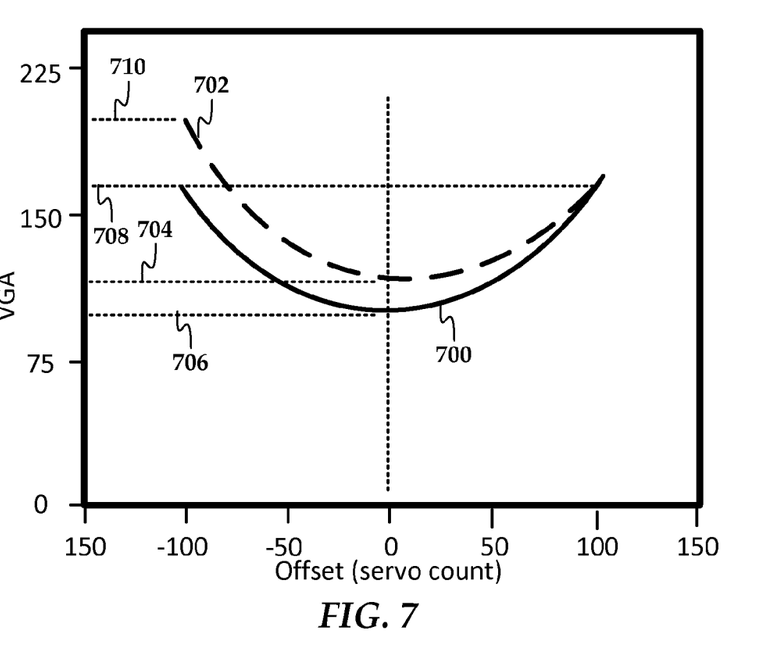

In reference now to FIGS. 6 and 7, graphs show example VGA measurements that may be used to qualify a HAMR read/write head according to an example embodiment. As will be described in greater detail below, the principles describe in relation to FIGS. 6 and 7 can also be applied to other measurements of cross track symmetry/asymmetry, such as amplitude and bit error rate. The graphs plot VGA amplification level (expressed as a digital input value to the VGA) versus a cross track offset (expressed as digital servo count values). The curves in the graphs are generally the inverse of the recorded signal strength, and include plots of nominal (e.g., within specification) VGA responses 600, 700 compared with asymmetric, degraded responses 602, 702. In this case, the same read/write head was tested in a normal and degraded state for purposes of comparison, but it will be understood that as-manufactured read/write heads may exhibit the illustrated degraded response, e.g., due to manufacturing defects or damage.

In FIG. 6, the responses 600, 602 have approximately the same maximum signal value, as evidenced by the minimum VGA value 604. However, the degraded response 602 has a higher signal value to the left side, as exhibited by lower VGA value 606 compared to value 608 at the right side of both curves 600, 602. There may be both advantages and disadvantages to this "spreading" of the maximum signal value. For example, the broader region of high signal value may make the recorded track less sensitive to slight mis-tracking of the read head. On the other hand, the high signal level on the left side may lead to cross track interference, and/or require increased track width, which can reduce the potential areal density of the recording medium. From a reliability standpoint, however, the asymmetry by itself may be an indicator that the read/write head is sub-optimum regardless of the recorded signal levels.

In FIG. 7, the responses 700, 702 have different maximum signal values, as evidenced by the minimum VGA values 704, 706. The degraded response 702 has a lower signal value overall compared to response 700, as well as being asymmetric. The asymmetry is evidenced by different right and left side minimum values 708, 710. This may result in both lower initial performance due to lower recorded signal levels and reduced reliability over time.

Figure 8:
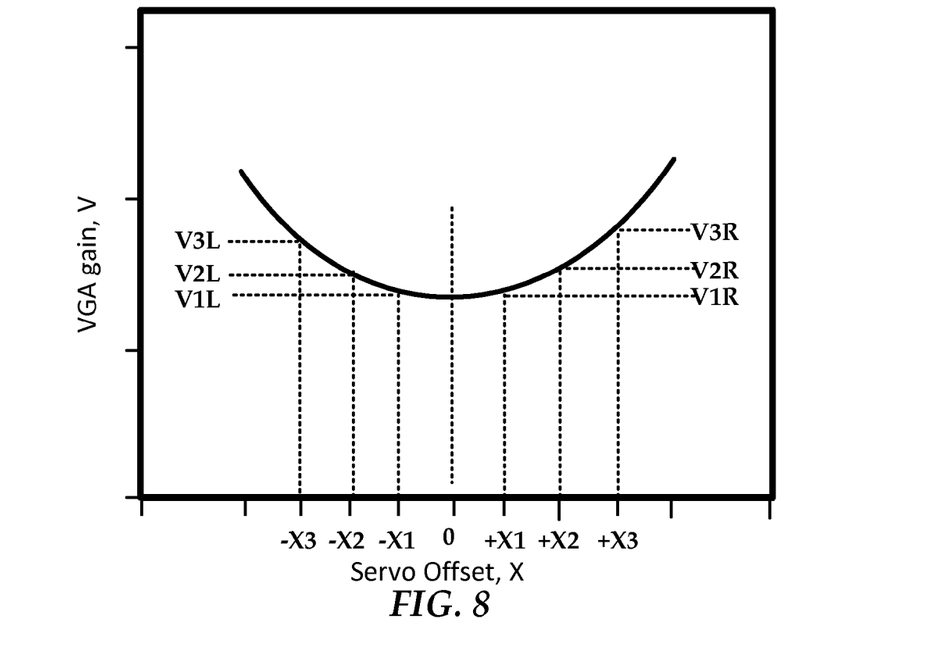
FIGS. 8 and 9 are graphs illustrating the calculation of symmetry according to example embodiments.
Figure 9:
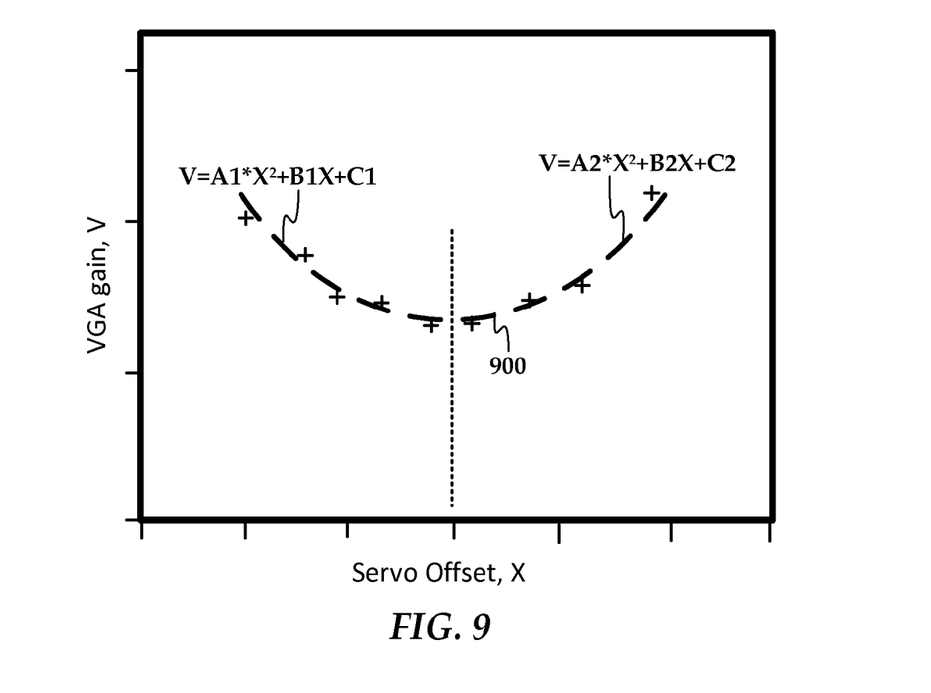

The methods described above may involve writing a few data sectors of a track of interest. The track may be located in any convenient zone, e.g., at a middle radius of the disk, and multiple zones may be used. The VGA gain over one or more of the data sectors is scanned from a servo offset of −X to +X, such that the VGA gain values (which are inversely proportional to amplitude/intensity of the magnetic signal) are measured at symmetric offsets around a track centerline. The VGA gain data points so obtained can be subsequently smoothed with a moving average to form the "bucket" shape curve as seen in FIGS. 6 and 7. In FIGS. 8 and 9, graphs show examples of how the symmetry of a cross-track profiled curve can be determined. As will be described in greater detail below, the principles describe in relation to FIGS. 8 and 9 can also be applied to other measurements of cross track symmetry/asymmetry, such as amplitude and bit error rate.

In the graph of FIG. 8, the VGA values V1L, V1R, V2L, V2R, V3L, V3R etc., at servo offsets of ±X1, ±X2, ±X3, etc., are compared with one another, e.g., $\delta 1 = \|V1L - V1R\|$, $\delta 2 = \|V2L - V2R\|$, $\delta 3 = \|V3L - V3R\|$, etc. The symmetry of the curve may be determined by looking at the function $\delta(X)$. For example, the symmetry may be tested based on a maximum value of the function $\delta(X)$ that exceeding a threshold limit, the function $\delta(X)$ having a slope that exceeds a limit, a statistical measure of the function $\delta(X)$ exceeding a limit, etc.

In FIG. 9, a graph illustrates another example of how VGA symmetry may be quantified. Generally, the discrete points may be compared to a parabola, e.g., as illustrated by the dashed curve 900. The parabola 900 may be predetermined and/or based at least in part on the measured points. In another embodiment, each side of the dashed curve 900 may be formed by fitting the points on either side of the X=0 axis to different parabolas of the form $V = AX^2 + BX + C$. In such a case, the coefficients A1, A2, B1, B2, C1 and C2 can be respectively compared to one another. In some cases, this may be simplified by determining minimum value of VGA gain (e.g., using a smoothed average) and setting this as V=0, such that the curves can be estimated as $V = AX^2 + BX$ (or $V = AX^2$). It will be understood that other curves besides parabolas may be used for a curve fit as appropriate, e.g., an elliptic section, sinusoid, etc.

In other embodiments, the cross-track profile of the recorded signal may be measured indirectly by analyzing cross-track values of bit error rate (BER) versus servo offset of the recording head. The read channel may be configured to provide measures of BER to an analysis module. In such a case, the cross track BER curves may be similar in shape as those shown in FIGS. 6-9 (e.g., with a minimum value near the track center), and symmetry may be measured in similar ways. In yet other embodiments, the amplitude of the signal versus servo offset of the recording head may be measured directly (e.g., via an oscilloscope, read channel, etc.) instead of using the VGA gain. Such measurements may provide data sets similar to those shown in FIGS. 6-9, except the vertical axis would be a measure of signal strength (e.g., signal-to-noise ratio) and the resulting curves would be inverted such that a maximum value would be seen near the track center. The symmetry in such a case may be measured in similar ways as described above.

As noted above, the asymmetry measurements may be made at one particular zone or over different zones. In the latter case, a zone-dependent measurement of asymmetry can be used to measure read/write head quality across the stroke of the disc. If the responses over some or all of the zones do not meet some type of criteria as described above, the read/write head is graded based on optical symmetry. For example, the grade may be determined on multiple criteria, such as all of the zone-specific values satisfying a threshold, a combination of the values (e.g., average, median, standard deviation, etc.) satisfying a threshold, a curve fit of the zone-specific values as a function of the zones satisfying a criteria, etc. This grade may be used to categorize heads for different uses and/or discard and/or rework any assemblies that include a head with a failing grade.

Figure 10:
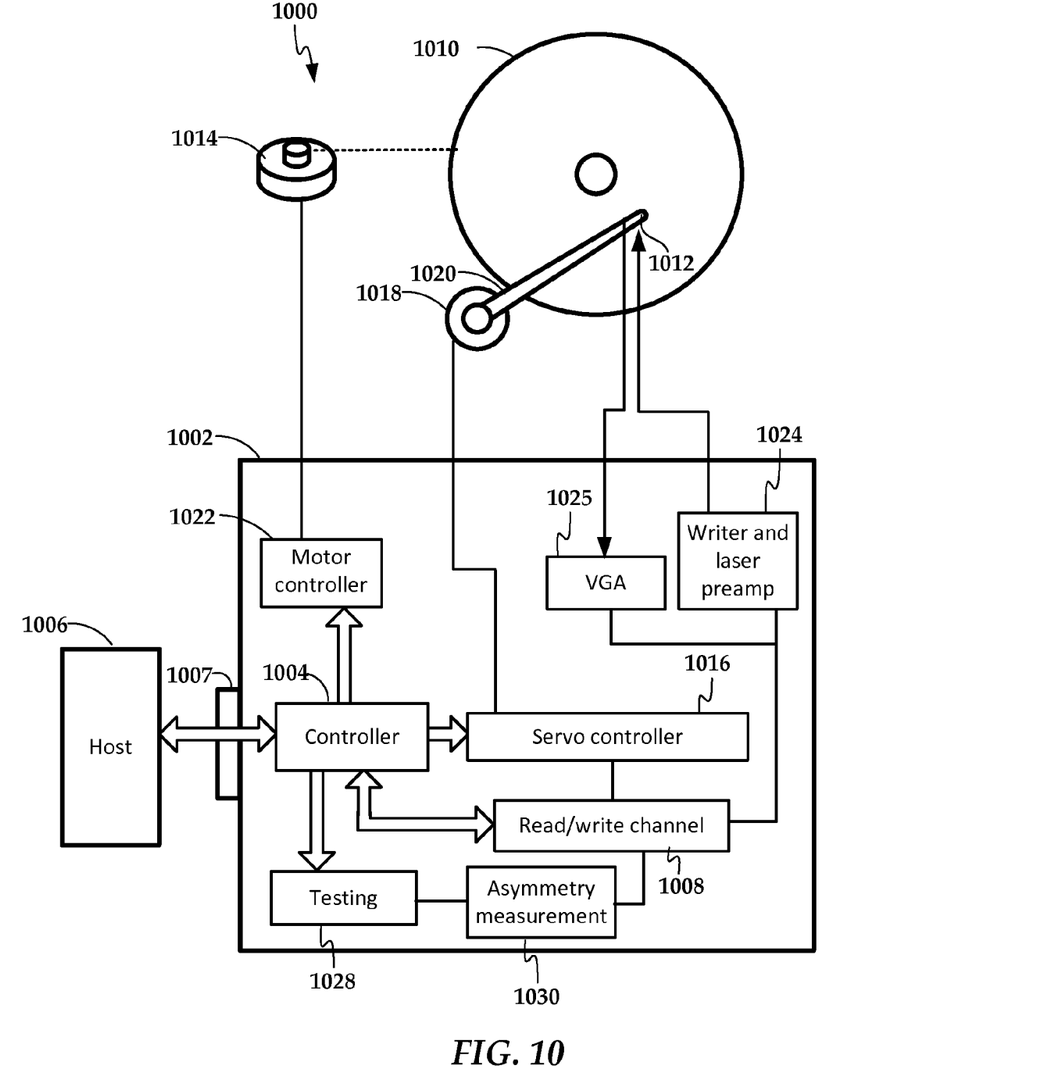
FIG. 10 is a block diagram of an apparatus according to an example embodiment.

In reference now to FIG. 10, a block diagram illustrates components of system 1000 according to an example embodiment. The system 1000 may be part of a test stand or include a fully-assembled hard drive. The system 1000 includes circuitry 1002 coupled to one or more read/write heads 1012 that may ultimately be used in a hard drive. The circuitry 1002 includes a controller 1004 that controls a number of functions of the system 1000, optionally including communications between the circuitry 1002 and a host device 1006 via a host interface 1007. The host device 1006 may include any electronic device that can be communicatively coupled to communicate with the circuitry 1002, e.g., a general-purpose computer, a factory test bench, remote terminal, etc.

The controller 1004 may include any combination of custom logic circuits, application specific integrated circuits (ASICs), general-purpose central processing unit (CPU), interface circuits, and may utilize instructions stored as firmware and/or software. The controller 1004 may read data from and write data to a recording medium (e.g., disk 1010) via a read/write channel 1008. The controller 1004 may, among other things, determine a location on the disk 1010 for the desired data, move the heads to the location (track) of the data, read or write the data via the read/write channel 1008, correct errors, transfer the data to/from the host 1006, etc.

The read/write channel 1008 converts data between the digital signals processed by the data controller 1004 and the analog signals conducted through read/write heads 1012. The read/write channel 1008 also provides servo data read from the disk 1010 to a servo controller 1016. The servo controller 1016 uses these signals to drive an actuator 1018 (e.g., voice coil motor) that rotates an arm 1020, upon which the read/write heads 1012 are mounted. The heads 1012 are moved radially across different tracks of the disk(s) 1010 by the actuator motor 1018 (e.g., voice coil motor), while a spindle motor 1014 rotates the disk(s) 1010. A microactuator (not shown) may also be included to provide finer tracking control, and also receives inputs from the servo controller 1016. The controller 1004 controls the spindle motor 1014 by way of a motor controller 1022.

During write operations, the read/write channel 1008 provides analog signals that are delivered to the read/write heads 1012 by way of one or more preamplifiers 1024. The preamplifier 1024 amplifies and conditions the write signals sent to write coils of the read/write heads 1012. In the illustrated embodiment, the preamplifier 1024 also includes circuitry that energizes a laser (or other energy source) at each of the read/write heads 1012 during write operations. The laser preamplifier conditions the signals to ensure the lasers provide sufficient energy to heat a spot on the disk 1010 as it is being recorded.

A VGA 1025 receives electrical signals from one or more of the read/write heads 1012 during read operations. The VGA 1025 provides a variable amount of gain so that the signal has sufficient amplitude without saturation for use by the read/write channel 1008. A testing module 1028 is operable by the controller to perform testing operations, e.g., during a design, manufacturing, and/or operational phase of a hard disk. As indicated by asymmetry measurement module 1030, the testing module 1028 is used to measure (e.g., via the VGA 1025, read/write channel 1008, or other hardware not shown such as an oscilloscope) a cross-track signal profile of one or more tracks written to the disk 1010. This testing may at least be used to determine write amplitude asymmetry and thereby qualify the read/write heads 1012.

In one example of the testing, the servo controller 1016 and read/write channel 1008 are commanded to record a signal to at least part of a track on the disk(s) 1010 using each of the read/write heads 1012. These track portions may include a known pattern of data to facilitate more easily decoding the data later on. The servo controller 1016 then reads back the parts of the tracks using multiple passes, while offsetting the respective read/write head 1012 different amounts relative to the track centerline for each of the passes. For each of the passes, a measured value a function of servo offset may be recorded by the asymmetry measurement module 1030. The measured value may include any combination of the amount of gain used by the VGA 1025 to read the data, signal-to-noise ratio of the signal, and bit error rate seen by the read write channel.

This measurement and recording of date may be repeated for each of the read/write heads 1012, and may be performed at multiple zones spread across the disk(s) 1010. The symmetry data may be analyzed as described above (e.g., tested against a threshold, averaged or otherwise combined) and used to qualify the read/write heads 1012, This qualification may involve grading and/or rejecting a read/write head 1012 during factory test, and may also be used in fielded hard drive assemblies, e.g., to diagnose performance issued, provide compensation for asymmetry, etc.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   recording a signal over at least part of a track on a heat-assisted recording medium via a heat-assisted magnetic recording head;
   determining a symmetry of a cross-track profile of the recorded signal via the recording head; and
   qualifying the recording head based on the symmetry of the cross-track profile.

2. The method of claim 1, wherein qualifying the recording head comprises failing the recording head if the symmetry is below a threshold.

3. The method of claim 1, wherein determining the symmetry of the cross-track profile comprises measuring an output of a variable gain amplifier of a read channel versus servo offset of the recording head.

4. The method of claim 1, wherein determining the symmetry of the cross-track profile comprises measuring amplitude of the recorded signal versus servo offset of the recording head.

5. The method of claim 1, wherein determining the symmetry of the cross-track profile comprises measuring a bit error rate of the recorded signal versus servo offset of the recording head.

6. The method of claim 1, wherein the symmetry of the cross-track profile is indicative of quality of a near-field transducer of the recording head.

7. The method of claim 1, wherein the writing of the track, the measuring of the cross-track profile, and the qualifying of the recording head are performed after assembly of the recording head to a head-gimbal assembly.

8. The method of claim 1, wherein the writing of the track, the measuring of the cross-track profile, and the qualifying of the recording head are performed after assembly of the recording head to an arm assembly that comprises two or more recording heads.

9. The method of claim 8, wherein the heat-assisted recording medium is a test medium.

10. The method of claim 1, wherein determining the symmetry of the cross-track profile comprises:
    performing first and second curve fits of first and second parts of the cross-track profile; and
    comparing the first and second curve fits.

11. The method of claim 10, wherein the first and second curve fits are parabolic.

12. The method of claim 1, wherein determining the symmetry of the cross-track profile comprises comparing first and second values of the cross track profile, the first and second values being measured at cross track locations symmetrically located around a track centerline.

13. A method comprising:
    for each zone of a plurality of zones of a heat-assisted recording medium:
       recording a signal over at least part of a track in each zone via a heat-assisted magnetic recording head; and
       determining a symmetry of a cross-track profile of the signal; and
    qualifying the recording head based on a symmetry of the cross-track profiles of the plurality of zones.

14. The method of claim 13, wherein determining the symmetry of the cross-track profiles of the plurality of zones comprises measuring an output of a variable gain amplifier of a read channel versus servo offset of the recording head.

15. The method of claim 13, wherein determining the symmetry for each of the cross-track profiles comprises:
    performing first and second curve fits of first and second parts of the cross-track profiles; and
    comparing the first and second curve fits.

16. The method of claim 13, wherein determining the symmetry for each of the cross-track profiles comprises comparing first and second values of each cross track profile, the first and second values being measured at cross track locations symmetrically located around a track centerline.

17. An apparatus comprising:
    a controller configured to read and write data via a heat-assisted magnetic recording head, the controller configured with instructions that perform:
       record a signal over at least part of a track on a heat-assisted recording medium via the heat-assisted magnetic recording head;
       determining a symmetry of a cross-track profile of the recorded signal via the recording head; and
       qualifying the recording head based on the symmetry of the cross-track profile.

18. The apparatus of claim 17, further comprising a read channel that utilizes a variable gain amplifier, and wherein determining the symmetry of the cross-track profile comprises measuring an output of the variable gain amplifier versus a servo offset of the recording head.

19. The apparatus of claim 17, wherein the apparatus comprises a test apparatus, and wherein the heat-assisted magnetic recording head is part of a hard drive subassembly.

20. The apparatus of claim 19, wherein the subassembly comprises an arm assembly that comprises two or more recording heads.

* * * * *